United States Patent [19]

Coover, Jr. et al.

[11] 3,759,264

[45] Sept. 18, 1973

[54] SURGICAL METHOD

[75] Inventors: Harry W. Coover, Jr., Kingsport, Tenn.; David W. Fassett, Rochester, N.Y.

[73] Assignee: Eastman Kodak Company, Rochester, N.Y.

[22] Filed: Apr. 7, 1966

[21] Appl. No.: 541,026

[52] U.S. Cl. .................. 128/334 R, 260/78.4 N
[51] Int. Cl. ............................................. A61b 17/04
[58] Field of Search ................. 128/334 R, 156; 260/78.4 N

[56] References Cited
UNITED STATES PATENTS

| | | | |
|---|---|---|---|
| 2,765,332 | 10/1956 | Coover et al. | 260/78.4 N |
| 2,794,788 | 6/1957 | Coover et al. | 260/78.4 N |
| 3,223,083 | 12/1965 | Cobey | 128/92 |
| 3,667,472 | 6/1972 | Halpern | 128/334 R |

OTHER PUBLICATIONS

Carton et al., Surg. Forum 11:238–9 1960.

Nathan et al., "Annals of Surgery" Vol. 152, No. 4, 1960, pages 648–659.

Kessler Surgical Forum 11:403–4, 1960.

*Primary Examiner*—Dalton L. Truluck
*Attorney*—R. Frank Smith and William T. French

[57] ABSTRACT

This invention relates to the surgical use of monomeric esters of α-cyanoacrylic acid having the formula

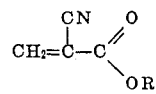

wherein $R$ is a saturated hydrocarbon radical of two to 10 carbon atoms for the purpose of bonding together living tissue.

12 Claims, No Drawings

SURGICAL METHOD

This invention relates to a new use for esters of α-cyanoacrylic acid and more particularly to a surgical method for joining tissue surfaces through the use of such esters as adhesives.

The usual methods for closing incisions in flesh and for setting bone fractures, by the use of sutures, clamps, pins or the like, have many drawbacks. The use of an adhesive substance for these surgical purposes would have the advantage of permitting rapid joining of the damaged members and of permitting natural healing. However, the common adhesives are unsuitable for surgical use. Most adhesives need too much time to form a bond. Many require the use of heat or pressure or the evaporation of a solvent, all of which make them unsuitable as surgical adhesives. Other adhesives, including some that might otherwise be suitable for surgical use, are excessively irritating to the body tissues.

References are found in the literature to the use of methyl α-cyanoacrylate as a bone cement or as a suturing material. In such use the methyl α-cyanoacrylate polymerizes in situ without the use of heat or pressure or the evaporation of a solvent. In many respects it is thus superior to conventional adhesives for surgical use. However, the use of methyl α-cyanoacrylate as a surgical adhesive has had some disadvantages. For one thing, the bonds that it forms are often too brittle for surgical purposes. Further, the methyl ester of α-cyanoacrylic acid is not consistently successful in forming a bond in living tissues, especially when there is oozing of blood or other fluids. Still further, commercial formulations of methyl α-cyanoacrylate have caused some unexplained side reactions.

The present invention is based on our discovery that certain higher esters of α-cyanoacrylic acid are unexpectedly superior to methyl α-cyanoacrylate as surgical adhesives and are free of disadvantages that have been encountered in surgical uses of the methyl ester.

The esters of α-cyanoacrylic acid (also designated as 2-cyanoacrylic acid) which are effective in the method of the invention can be represented by the formula:

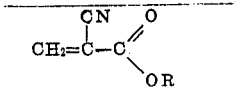

wherein R is a saturated hydrocarbon radical of 2 to 10 carbon atoms.

In accordance with the invention we have found that these esters are markedly superior to methyl 2-cyanoacrylate as surgical adhesives. The bonds that they form are more flexible than those of the methyl ester. In normal surgical use they do not evolve the pungent irritating vapor that characterizes the methyl ester. They have greater hydrolytic stability than the methyl ester, a property of considerable value in view of the fact that in normal use a surgical adhesive can be expected to be in contact with moisture. They form reasonably rapid bonds and they are more consistent than the methyl ester in forming firm closures of flesh incisions, particularly when seepage of blood or other fluids creates difficulties.

The α-cyanoacrylate esters that we use are esters of saturated aliphatic alcohols, by which we mean open chain or alicyclic alcohols, having 2 to 10 carbon atoms, those having 3 to 6 carbon atoms being particularly suitable. Examples include esters in which R of the above formula is a saturated hydrocarbon radical such as ethyl, propyl, isopropyl, n-butyl, isobutyl, amyl, isoamyl, capryl, cyclopentyl, cyclohexyl, 2-ethylhexyl, etc. Preferred as surgical adhesives are the esters of branched alkanols having a single alkyl side chain, i.e., esters of the above formula in which R is a singly branched chain alkyl radical. Among their other good properties such esters and their polymeric bonds are less sensitive to water than the methyl ester. Especially preferred among such esters is the isobutyl ester. The isobutyl ester is outstanding in forming rapidly a flexible bond of adequate strength for surgical purposes. It has very little odor. It is soluble in ethanol, which makes it easy to remove from tissues when necessary.

The α-cyanoacrylate esters can be produced by the procedure of the patent to Joyner and Hawkins, U.S. Pat. No. 2,721,858, involving reaction of an alkyl cyanoacetate with formaldehyde in a non-aqueous organic solvent and in the presence of a basic catalyst, followed by pyrolysis of the anhydrous intermediate polymer in the presence of polymerization inhibitor. The α-cyanoacrylate monomers prepared with low moisture content and essentially free of impurities have the best activity for surgical use. A preferred method for preparing such monomers is described in Belgian Pat. No. 611,273.

The indicated esters of α-cyanoacrylic acid polymerize from the liquid to the solid state by an anionic polymerization mechanism and have a marked affinity for adhering to surfaces of living tissue. The cause for this affinity is not certain but it is believed that the highly polar nature of the ester molecule is responsible because the living skin, bone and other tissues are known to be polar. Since the polymerization of these monomeric esters is initiated by an anionic attack, the polymerization is accelerated somewhat when the monomer comes into contact with the body fluids. When a faster setting bond is desired, a basic material can be used to accelerate polymerization of the monomer. Such basic materials can be amines, alcohols or the like.

The esters of α-cyanoacrylic acid can be used alone or blended with minor amounts of additives such as thickening agents, plasticizers, antibiotics or the like. The use of mixtures of the higher esters is also within the scope of the invention. Of course, the materials mixed with the α-cyanoacrylate ester must not cause the monomeric ester to polymerize prematurely and must not have an adverse effect on the healing process.

Examples of suitable thickening agents or viscosity modifiers for such compositions include various polymeric or resinous materials such as poly(alkyl 2-cyanoacrylates), poly(acrylates), poly(methacrylates), cellulose esters such as cellulose acetate, cellulose butyrate, cellulose acetate phthalate and the like, etc., the polymers of alkyl 2-cyanoacrylates being preferred. Typical of the suitable plasticizers are dimethyl sebacate, di-n-butyl sebacate, di-n-octyl phthalate, triethyl phosphate, triisobutyl phosphate, tri(2-ethylhexyl) phosphate, tri-p-cresyl phosphate, glyceryl triacetate, glyceryl tributyrate, diethyl sebacate and other plasticizer esters of the types disclosed in the patent to Joyner and Coover, U.S. Pat. No. 2,784,127.

In the compositions containing additives, the α-cyanoacrylate monomer is the major component and preferably is at least about 75 weight percent of the composition. These compositions can contain up to about 20 percent by weight, based on the α-cyanoacrylate monomer, of the described polymeric thickening agent or viscosity modifier and up to about 20 percent by weight based on the monomer of the described plasticizers. Preferably, for rapid adhesive action the amount of plasticizer is about 1 to 5 percent by weight based on the monomer. In this preferred range the ester plasticizers improve the flexibility of the adhesive bond without adversely affecting the adhesive qualities of the α-cyanoacrylate.

As we have indicated, a catalyst or accelerator can be used to obtain a more rapid bond. However, the catalyst would not be added to the α-cyanoacrylic acid ester any substantial length of time before the surgical use because it would cause the monomer to polymerize prematurely. The catalysts are normally used by application to the surfaces of the tissues to be bonded. The adhesive monomer is applied to the same or to the other surface and the two surfaces are promptly brought together and held in place until a bond is formed. Normally, this requires only a few seconds. Suitable polymerization catalysts or accelerators are those that have no adverse affect on the tissues being treated and include suitable solutions of aliphatic alcohols such as methanol, isobutanol, capryl alcohol, etc; and of such basic materials as ammonia, piperidine, pyridine, etc.

While the higher esters of α-cyanoacrylic acid have reasonably good stability as monomers when stored in bulk, especially when the esters are of high purity, polymerization inhibitors can be used to increase the storage stability. Suitable inhibitors or stabilizers that can be used in small amounts, e.g., 0.0001 to 0.01 weight percent, include sulfur dioxide, hydroquinone, nitric oxide, organic acids, etc. The preferred stabilizers are those having the least adverse physiological affect.

Our work has indicated that the biological utility of the α-cyanoacrylate monomers is not directly related to their effectiveness in joining together inanimate objects. In the series of esters of alkanols of 2 to 10 carbon atoms there appears to be an increasing effectiveness in rapid formation of strong, firm bonds with an increase in length of the alkyl chain of the alcohol moiety of the ester, although this may be accompanied by some increase in temporary irritation, at least with the capryl ester. The isobutyl ester is particularly outstanding. The bonds formed from it are strong, the wounds heal promptly, there is little irritation from the monomer and the bonds are more flexible than the bonds formed with other esters.

The adhesive compositions used in the method of the invention form strong bonds with all types of human and animal tissues. The bonds are strongest when a minimal amount of adhesive is applied. This makes it possible for the normal fibroblasts and other cellular elements of healing to penetrate rapidly through the bond where necessary to permit the natural healing process to take place. As we have indicated, the slightly alkaline pH of the body fluids act as a natural catalyst to the polymerization of the monomer. Some body fluids interfere with the formation of the bond and must be controlled. Another difficulty that can be encountered is in eliminating contact of the adhesive with tissue underlying the tissue that it is desired to bond. Such contact can cause adhesions to form that make an undesirable wound closure. We mention these difficulties merely to show that when using an adhesive for surgical purposes skillful manipulation is required for best results. Despite these difficulties the fact remains that the higher esters of α-cyanoacrylic acid provide a valuable new means for achieving surgical bonding.

The practice of the method of the invention is further illustrated by the examples hereinafter.

In the examples employing guinea pigs the general procedure was that the guinea pigs were immobilized, a local anesthetic was injected into a large area of the back and lateral incisions of about 2 to 4 centimeters were made across the mid-back region. Full thickness incisions were made and the wounds gaped with a moderate amount of bleeding. The blood was sponged and hemostats were used to control further bleeding. After bleeding had stopped or was minimal the adhesive composition was drawn into a capillary tube and excessive quantities were applied to both surfaces of the skin from the capillary tube. Excess adhesive was quickly wiped off and the two edges were lightly pinched together until they adhered. Normally in these tests the skin was swabbed with 70 percent ethanol. The instruments were clean, though not necessarily sterile. The monomeric esters are sterile as produced and do not permit growth of organisms with which they may be contacted accidentally. No frank infections were noted in the experimental animals.

EXAMPLE 1

Using the above general procedure the monomer, isobutyl 2-cyanoacrylate, was successfully used on three guinea pigs to seal a full thickness incision 1 inch in length. Immediate polymerization and firm closure were observed. The results were substantially better than obtained with methyl 2-cyanoacrylate with respect to immediate and strong closure of the incision. The incisions healed rapidly. It appears that the polymer was removed from the wound area during the healing period at a satisfactory rate. Good fibroblastic response was noted. There was little evidence of any foreign body reaction. The epithelium completely healed over the area. The bonds were substantially less brittle than those formed with methyl 2-cyanoacrylate, both immediately after incision and in the course of the next few days.

EXAMPLE 2

In the manner of Example 1, capryl α-cyanoacrylate was used for adhesive bonding of incisions on five guinea pigs, and immediate firm bonds formed in each test. The wounds appeared to heal normally. During the first 24 hours following application there was somewhat more swelling of the tissue than was observed with isobutyl α-cyanoacrylate. However, this swelling was temporary. Subcutaneous injections of the capryl α-cyanoacrylate have shown no unusual inflammatory reaction.

EXAMPLE 3

A monomeric sample of isobutyl 2-cyanoacrylate was used to close a 3-inch incision in a mongrel dog. The sides of the incision were held in place while the adhesive was applied with a sterile brush. After the monomer had polymerized, it was observed that the edges of the incision were perfectly matched and that the incision was covered and protected by a flexible, water-resistant film which did not restrict normal movements of the injured animal. After a period of several days, the incision had healed completely with only a very fine scar being produced. The use of monomeric cyclohexyl 2-cyanoacrylate as an adhesive in the same manner produced similar good results.

EXAMPLE 4

In this experiment, monomeric n-butyl 2-cyanoacrylate thickened with 5 percent by weight of a poly(n-butyl 2-cyanoacrylate) was used to suture an incision on the stomach of a guinea pig. The area around the incision was moistened with an ethanol solution of novocaine which serves two functions: 1. to anesthesize the area, and 2. to promote the bonding action of the adhesive. The n-butyl 2-cyanoacrylate adhesive was painted over the incision with a small artist's brush. A good film over the wound was obtained by use of two coats of adhesive. After several days, the incision had healed neatly with only a fine scar being produced.

The invention has been described in considerable detail with particular reference to certain preferred embodiments thereof, but it will be understood that variations and modifications can be effected within the spirit and scope of the invention as described hereinabove, and as defined in the appended claims.

We claim:

1. The method for surgical bonding of body tissues which comprises applying to at least one of the tissue surfaces to be bonded an adhesive composition comprising a monomeric ester of α-cyanoacrylic acid of the formula:

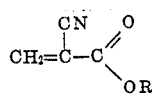

wherein $R$ is a saturated hydrocarbon radical of 2 to 10 carbon atoms, bringing together the surfaces to be bonded and polymerizing said monomeric ester while in contact with such surfaces.

2. The method according to claim 1 in which $R$ is alkyl of 3 to 6 carbon atoms.
3. The method according to claim 1 in which said ester is isobutyl α-cyanoacrylate.
4. The method according to claim 2 in which said ester is pentyl α-cyanoacrylate.
5. The method according to claim 2 in which said ester is butyl α-cyanoacrylate.
6. The method according to claim 2 in which said ester is ethyl α-cyanoacrylate.
7. Surgical method which comprises applying to incisions or wounds in body tissues an adhesive composition comprising a monomeric ester of alpha-cyanoacrylic acid of the formula:

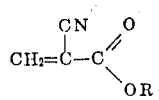

; wherein $R$ is a saturated hydrocarbon radical of 2–10 carbon atoms, and polymerizing said monomeric ester while it is in contact with said body tissues and with body fluid seepage to form a protective bond with said tissues.

8. The method according to claim 7 in which $R$ is alkyl of 3 to 6 carbon atoms.
9. The method according to claim 7 in which said ester is isobutyl alpha-cyanoacrylate.
10. The method according to claim 7 in which said ester is pentyl α-cyanoacrylate.
11. The method according to claim 7 in which said ester is butyl α-cyanoacrylate.
12. The method according to claim 7 in which said ester is ethyl α-cyanoacrylate.

* * * * *

UNITED STATES PATENT OFFICE
CERTIFICATE OF CORRECTION

Patent No. 3,759,264    Dated September 18, 1973

Inventor(s) Harry W. Coover, Jr., et al.

It is certified that error appears in the above-identified patent and that said Letters Patent are hereby corrected as shown below:

Column 1, between the title and line 1, please insert the following:

-- This application is a Stream lined Continuation of Serial No. 225,896, filed September 24, 1962, now abandoned. --

Signed and sealed this 15th day of October 1974.

(SEAL)
Attest:

McCOY M. GIBSON JR.
Attesting Officer

C. MARSHALL DANN
Commissioner of Patents